US012634294B1

(12) United States Patent
Do et al.

(10) Patent No.:     US 12,634,294 B1
(45) Date of Patent:         May 19, 2026

(54) TECHNIQUES FOR PROVIDING COMPLY-TO-CONNECT FOR SECURE NETWORK ACCESS

(71) Applicant: Absolute Software Corporation, Vancouver (CA)

(72) Inventors: Duy Do, Ho Chi Minh (VN); Hien Le, Ho Chi Minh (VN); Hung Nguyen, Ho Chi Minh (VN); Duc Le, Ho Chi Minh (VN)

(73) Assignee: Absolute Software Corporation, Vancouver (CA)

( * ) Notice: Subject to any disclaimer, the term of this patent is extended or adjusted under 35 U.S.C. 154(b) by 0 days.

(21) Appl. No.: 19/360,385

(22) Filed: Oct. 16, 2025

(51) Int. Cl.
H04L 9/40          (2022.01)
H04L 9/08          (2006.01)

(52) U.S. Cl.
CPC .......... H04L 63/105 (2013.01); H04L 9/0872 (2013.01)

(58) Field of Classification Search
CPC ........................... H04L 63/105; H04L 9/0872
See application file for complete search history.

(56)                  References Cited

U.S. PATENT DOCUMENTS

| | | | |
|---|---|---|---|
| 8,381,287 B2 * | 2/2013 | Trotter | H04L 63/0853 726/20 |
| 2016/0099963 A1 * | 4/2016 | Mahaffey | H04L 63/166 726/25 |
| 2016/0182471 A1 * | 6/2016 | Wilson | H04L 63/06 713/164 |
| 2017/0310707 A1 * | 10/2017 | Amelchenko | H04L 63/102 |
| 2021/0271651 A1 * | 9/2021 | Calvo | H04L 63/0823 |
| 2022/0046059 A1 * | 2/2022 | Pandurangi | H04L 63/20 |
| 2023/0401332 A1 * | 12/2023 | Vahidnia | H04L 63/101 |

* cited by examiner

*Primary Examiner* — Cheng-Feng Huang
(74) *Attorney, Agent, or Firm* — GREENBLUM & BERNSTEIN, P.L.C.

(57)                   ABSTRACT

A system and method for performing persistent comply to connect (C2C) for establishing a connection to a network is provided. The method includes receiving, at a secure access (SA) server from an endpoint device, a request to access a network, and continuously collecting, by a secure endpoint (SE) agent, data from the endpoint device. Based on the continuous collection, determining a compliance status of the endpoint device, and automatically enforcing, by an SA server, one or more policy actions based on real-time compliance data of the endpoint device to force the endpoint device into compliance. The method further includes continuously monitoring, after the endpoint device has been granted access to the network, the compliance status of the endpoint device for a change event, and automatically enforcing a policy action to resolve a change in the compliance status.

20 Claims, 9 Drawing Sheets

FIG. 1

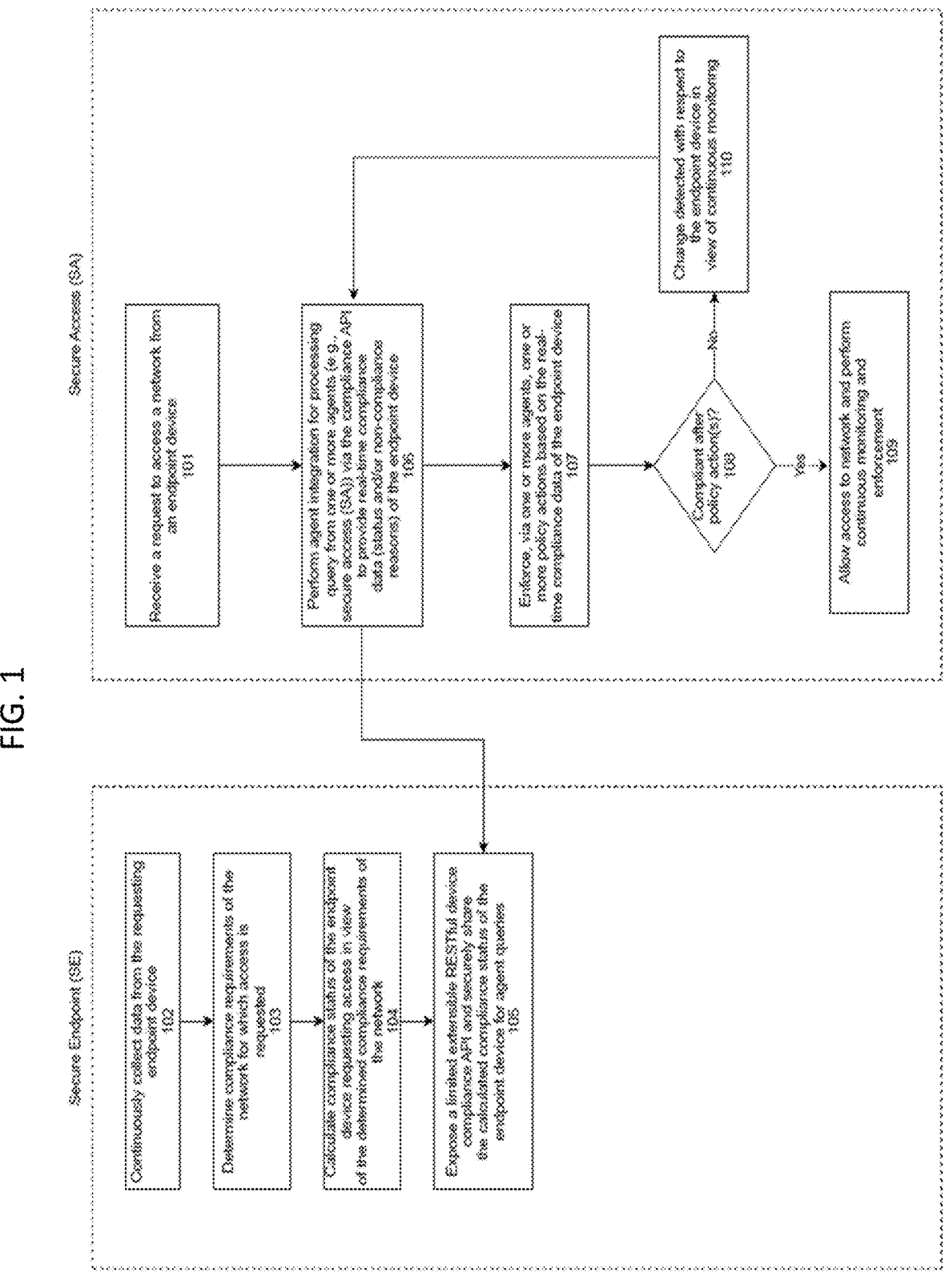

Secure Access (SA)

Receive a request to access a network from an endpoint device
101

Perform agent integration for processing query from one or more agents (e.g., secure access (SA)) via the compliance API to provide real-time compliance data (status and/or non-compliance reasons) of the endpoint device
106

Enforce, via one or more agents, one or more policy actions based on the real-time compliance data of the endpoint device
107

Compliant after policy action(s)?
108

No → Change detected with respect to the endpoint device in view of continuous monitoring
110

Yes → Allow access to network and perform continuous monitoring and enforcement
109

Secure Endpoint (SE)

Continuously collect data from the requesting endpoint device
102

Determine compliance requirements of the network for which access is requested
103

Calculate compliance status of the endpoint device requesting access in view of the determined compliance requirements of the network
104

Expose a limited extensible RESTful device compliance API and securely share the calculated compliance status of the endpoint device for agent queries
105

FIG. 3B

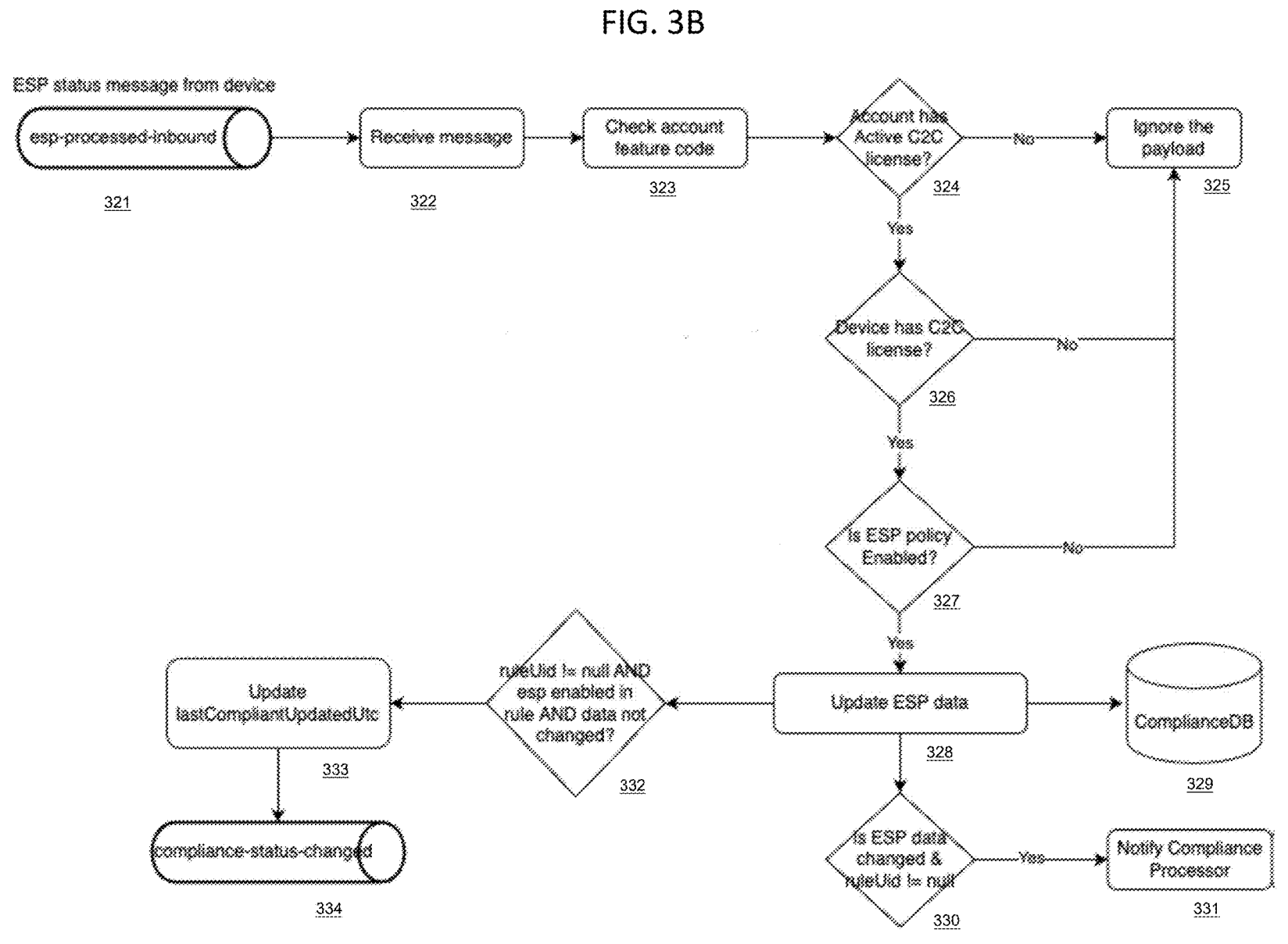

ESP status message from device esp-processed-inbound — 321

Receive message — 322

Check account feature code — 323

Account has Active C2C license? — 324

No → Ignore the payload — 325

Yes → Device has C2C license? — 326

No → Ignore the payload — 325

Yes → Is ESP policy Enabled? — 327

No → Ignore the payload — 325

Yes → Update ESP data — 328

Update ESP data → ComplianceDB — 329

If ESP data changed & ruleUid != null — 330

Yes → Notify Compliance Processor — 331 ruleUid != null AND esp enabled in rule AND ESP data not changed? — 332

Update lastCompliantUpdatedUtc — 333 compliance-status-changed — 334

FIG. 3C

Figure 4C:
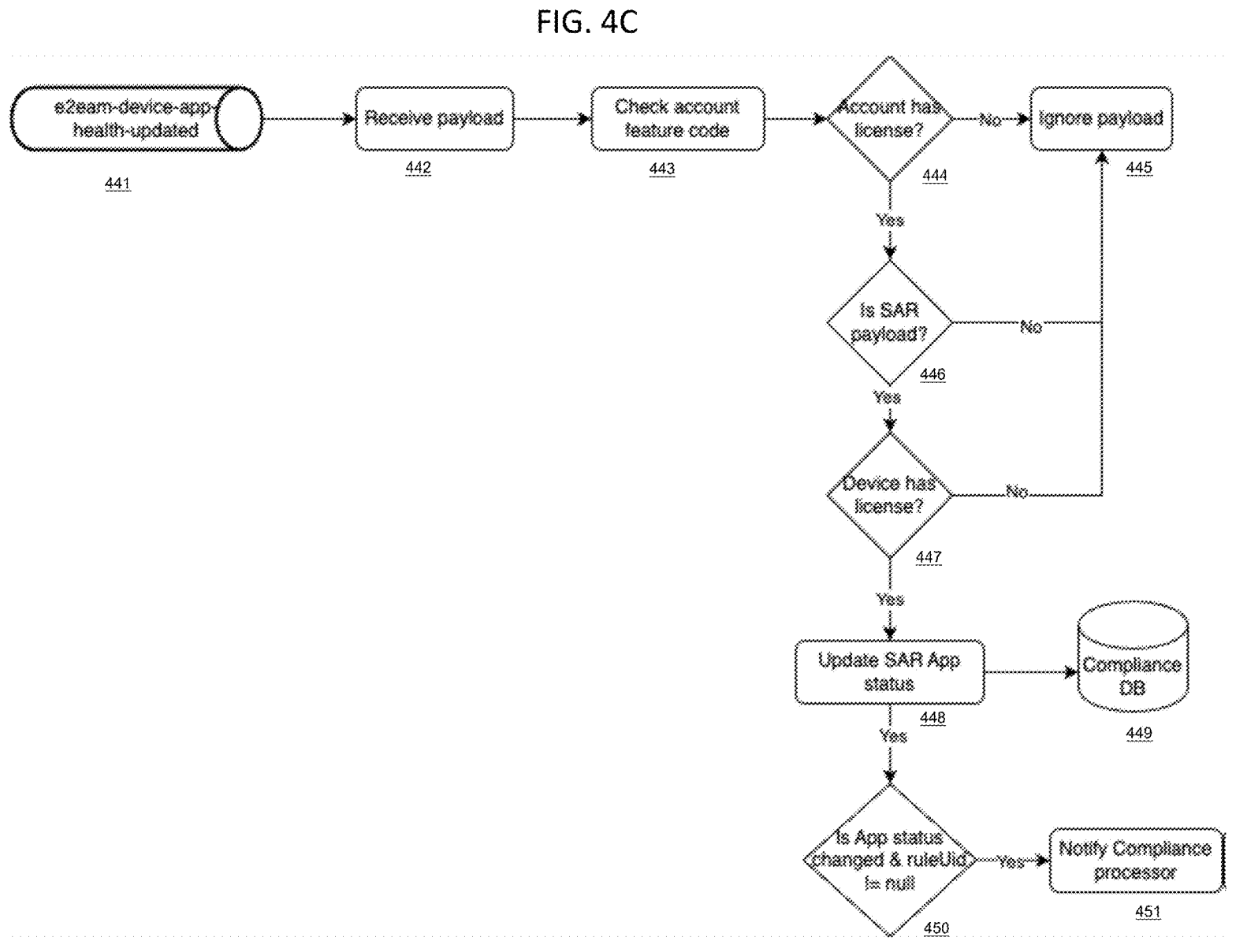

FIG. 4C e2eam-device-app
health-updated
<u>441</u>

Receive payload
<u>442</u>

Check account
feature code
<u>443</u>

Account has
license?
<u>444</u>

Ignore payload
<u>445</u>

No → Ignore payload

Yes →

Is SAR
payload?
<u>446</u>

No →

Yes →

Device has
license?
<u>447</u>

No →

Yes →

Update SAR App
status
<u>448</u>

Compliance
DB
<u>449</u>

Is App status
changed & ruleUid
is null
<u>450</u>

Yes →

Notify Compliance
processor
<u>451</u>

TECHNIQUES FOR PROVIDING COMPLY-TO-CONNECT FOR SECURE NETWORK ACCESS

TECHNICAL FIELD

This disclosure generally relates to providing end-to-end secure network access. More specifically, the present disclosure relates to providing persistent compliance checks and enforcement to ensure continued end-to-end secure network access.

BACKGROUND

Unless otherwise indicated, it should not be assumed that any of the developments described in this section qualify as prior art merely by virtue of their inclusion in this section, or that those developments are known to a person of ordinary skill in the art.

Conventionally, when an endpoint device requests access to a network, a compliance check may be performed in response to the request by the endpoint device before access is granted to the requesting endpoint device. Based on the performed compliance check, the requesting endpoint device may be granted access or denied access. Once denied, a user may be required to investigate reasons for the denial, and re-attempt network access once the reasons for the denial have been addressed. On the other hand, once the endpoint device has been granted access, the endpoint device may be free to access the network without further compliance checks.

However, larger organizations cannot reasonably ensure that all endpoint devices maintain compliance with various security policies, particularly as device diversity and remote work increase. Such a situation leads to difficulty in ensuring continuous compliance all endpoints, not limited to the time of network connection as provided by conventional compliance checks. Moreover, the above noted situation may additionally lead to issues with enforcing network access and device remediation actions based on up-to-date, reliable compliance data. Also, the above noted situation may lead to issues with achieving scalable integration and unified policies across heterogeneous environments, which may include multiple agent types, various operating systems (OS), remote users and the like.

Accordingly, in consideration of the above noted limitations associated with conventional compliance checks, a more robust and secure compliance check system and method is desired.

SUMMARY

To address the deficiencies/limitations in the known art, techniques for ensuring continued device compliance to ensure continued network security, even in heterogeneous environments, are described.

Embodiments described herein include a method for performing persistent comply to connect (C2C) for establishing a connection to a network. The method includes receiving, at a secure access (SA) server from an endpoint device, a request to access a first network; continuously collecting, by a secure endpoint (SE) agent, data from the endpoint device requesting to access the first network; determining, by an SE server, compliance requirements of the first network; calculating, by the SE server, compliance status of the endpoint device in view of the determined compliance requirements of the first network; exposing, by the SE server, a limited device compliance API for securely sharing the calculated compliance status of the endpoint device with an SA server; performing, by the SA server, integration with the SE server via the limited device compliance API for processing query from the SA server, and receiving real-time compliance data of the endpoint device; automatically enforcing, by the SA server, one or more policy actions based on the real-time compliance data of the endpoint device when the real-time compliance data of the endpoint device indicates non-compliance with at least one of the compliance requirements of the first network; and continuously monitoring, after the endpoint device has been forced into compliance and granted access to the first network, the compliance status of the endpoint device for a change in the compliance status, and automatically enforcing, by the SA server, the one or more policy actions to resolve the change in the compliance status of the endpoint device.

According to embodiments, the data from the endpoint device includes data related to geolocation, operating system (OS) type and version, encryption status, antivirus protection status, and application resilience of the endpoint device.

In accordance with embodiments, the compliance requirements include one or more of operating system requirement, encryption protection, antivirus protection, geolocation, and application resilience In other embodiments, the geolocation requires the endpoint device to be located in a location among a plurality of authorized location.

According to other embodiments, the geolocation requires the endpoint device not to be located in a location among a plurality of unauthorized locations.

In accordance with still other embodiments, the operating system requirement includes a type of operating system active on the endpoint device corresponding to an authorized operating system among a plurality of authorized operating systems.

In accordance with embodiments, the operating system requirements further includes a version of the authorized operating system to be included within a range of authorized versions.

In accordance with embodiments, the encryption protection requires that endpoint is fully encrypted or encryption is suspended, in progress, or used space encrypted at the endpoint device.

In accordance with embodiments, the application resilience (AR), application persistence (AP) or scaling application resilience (SAR) requires that all applications used in compliance assessment must be in compliant/healthy status.

In accordance with embodiments, the compliance requirements of the first network is configurable by an administrator of the first network.

In accordance with embodiments, the compliance requirements of the first network are different from compliance requirements of a second network different from the first network.

In accordance with embodiments, the first network and the second network are included in Department of Defense Information Network.

In accordance with embodiments, the real-time compliance data includes a compliance status with respect to a compliance requirement among the compliance requirements of the first network.

In accordance with embodiments, the real-time compliance data further includes a corresponding non-compliance reason when the compliance status indicates a non-compliance.

In accordance with embodiments, the one or more policy actions include an automated action on the endpoint device to resolve the non-compliance of the endpoint device.

In accordance with embodiments, the automated action includes automatically installing an authorized antivirus program or an authorized operating system version on the endpoint device, or updating or patching an already installed authorized antivirus program or operating system.

In accordance with embodiments, the automated action includes automatically activating encryption on the endpoint device.

In accordance with embodiments, the automated action includes temporarily freezing access to the first network and performing continuous monitoring until the endpoint device becomes compliant with respect to the compliance requirements of the first network.

According to an aspect of the present disclosure, a system for performing persistent C2C for establishing a connection to a network. The system includes an endpoint device having a processor and a memory storing an SE agent. The system is configured to perform: receiving, at the SA server from an endpoint device, a request to access a first network; continuously collecting, via the SE agent, data from the endpoint device requesting to access the first network; determining, via an SE server, compliance requirements of the first network; calculating, via the SE server, compliance status of the endpoint device in view of the determined compliance requirements of the first network; exposing, via the SE server, a limited device compliance API for securely sharing the calculated compliance status of the endpoint device with an SA server; performing, via the SA server, integration with the SE server via the limited device compliance API for processing query from the SA server, and receiving real-time compliance data of the endpoint device; automatically enforcing, via the SA server, one or more policy actions based on the real-time compliance data of the endpoint device to force the endpoint device into compliance when the real-time compliance data of the endpoint device indicates non-compliance with at least one of the compliance requirements of the first network; and continuously monitoring, after the endpoint device has been forced into compliance and granted access to the first network, the compliance status of the endpoint device for a change in the compliance status, and automatically enforcing, by the SA server, the one or more policy actions to resolve the change in the compliance status of the endpoint device.

According to an aspect of the present disclosure, a non-transitory computer readable storage medium that stores a computer program for performing persistent C2C for establishing a connection to a network, when executed by a processor, causing a system to perform a process including: receiving, at an SA server from an endpoint device, a request to access a first network; continuously collecting, by an SE agent, data from the endpoint device requesting to access the first network; determining, by an SE server, compliance requirements of the first network; calculating, by the SE server, compliance status of the endpoint device in view of the determined compliance requirements of the first network; exposing, by the SE server, a limited device compliance API for securely sharing the calculated compliance status of the endpoint device with an SA server; performing, by the SA server, integration with the SE server via the limited device compliance API for processing query from the SA server, and receiving real-time compliance data of the endpoint device; automatically enforcing, by the SA server, one or more policy actions based on the real-time compliance data of the endpoint device to force the endpoint device into compliance when the real-time compliance data of the endpoint device indicates non-compliance with at least one of the compliance requirements of the first network; and continuously monitoring, after the endpoint device has been forced into compliance and granted access to the first network, the compliance status of the endpoint device for a change in the compliance status, and automatically enforcing, by the SA server, the one or more policy actions to resolve the change in the compliance status of the endpoint device.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 1 illustrates an exemplary process for performing comply-to-connect (C2C) according to embodiments.

FIGS. 3A-3C illustrate exemplary flowcharts for updating compliance status of an endpoint device according to embodiments.

FIGS. 4A-4D illustrate exemplary flowcharts for application resilience (SAR) according to embodiments.

DETAILED DESCRIPTION

Figure 2:
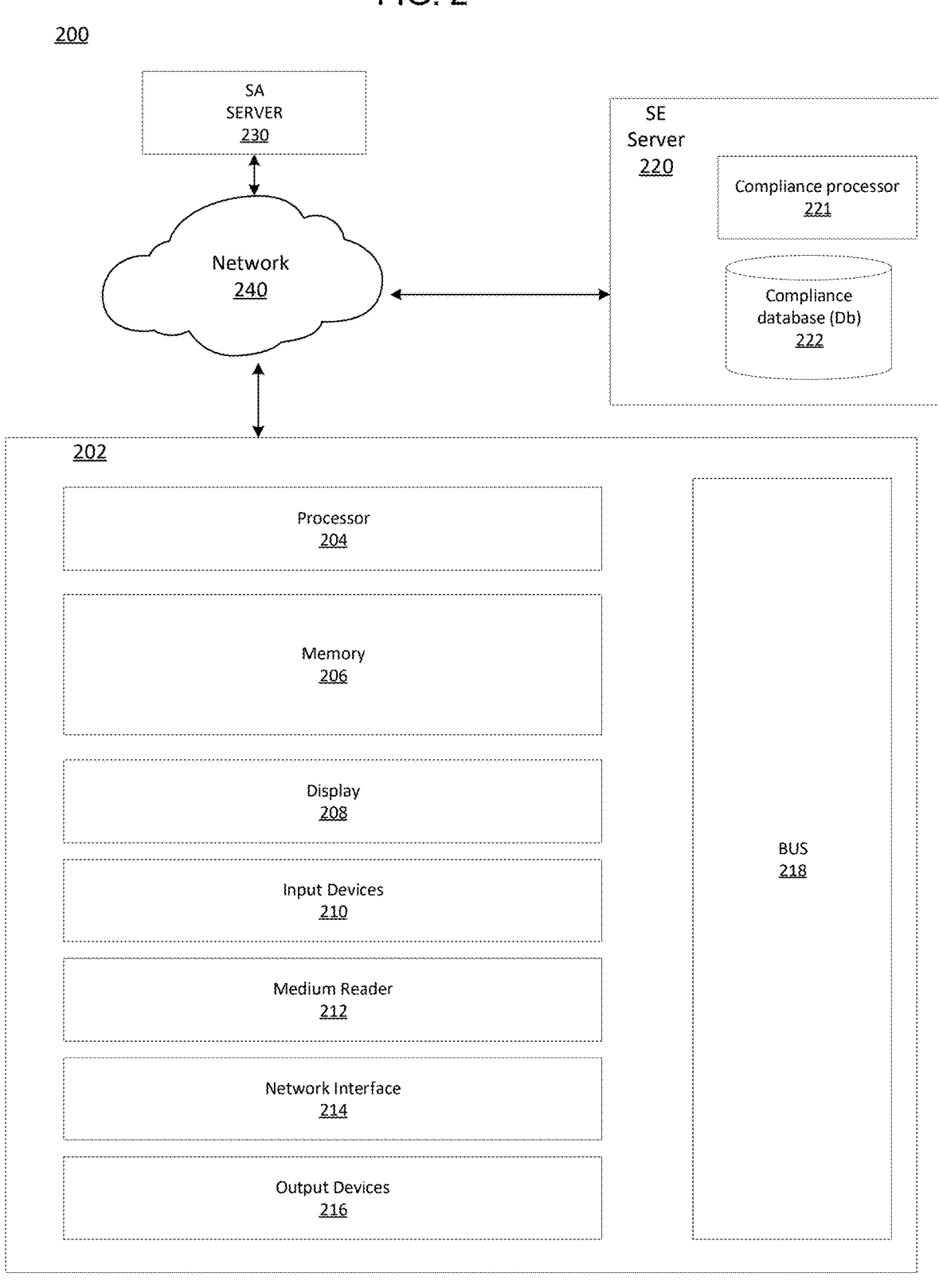
FIG. 2 illustrates an exemplary structure of a portion of the client device according to embodiments.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary flow diagram illustrating performance of comply-to-connect (C2C) according to embodiments of the invention. According to aspects of the present disclosure, a heterogeneous security ecosystem may be formed of various networks, with each network having its own set of compliance requirements. For example, the Department of Defense Information Network (DoDIN) may include a number of different networks with differing security requirements at both non-classified and classified levels. Endpoint devices may be required to be compliant in order to be granted access to a network.

Each endpoint device may have at least one secure endpoint (SE) agent. In an example, the SE agent or a portion of the SE agent may be operated or controlled by a basic input/output system (BIOS). SE server may communicate with a secure access (SA) server or system to perform one or more compliance checks on the endpoint device. The SE agent, if necessary, may automatically perform one or more policy actions, such as device remediation actions, on an endpoint device in need of remediation. These actions can be in the form of computer-implemented instructions that are designed to mitigate a particular risk. For instance, the mitigated risk may be that the endpoint's computing environment is such that it may not be in compliance with a particular policy for a particular network. As such, the instructions provided may cause configurational changes with the endpoint to cause it to continue to be in compliance with the policy. Such compliance, in turn, may enable the endpoint to, for example, provide authorized access to the network. Accordingly, aspects of the present disclosure provides a C2C framework to ensure a seamless secure connection to a requested network. Moreover, the C2C framework may be continually applied or enforced during an endpoint device's connection to the network, and not only at its initially connection as conventionally performed, to ensure that the secure access of the network is maintained throughout for increased network security, even in a changing environment or in view of an ad-hoc policy change for compliance.

According to exemplary aspects, the SA server may provide limited interaction with the requesting endpoint device via a compliance application programming interface (API) without providing access to the requested network. The SA server may utilize the compliance API to obtain compliance status and/or properties from the SE server, and invoke actions to be performed by the SE agent. The SE server may also provide administrator defined compliance or define compliance policy based on compliance properties obtained. The SA agent may be able to identify and enforce pre-defined and/or administrator defined compliance policies on the requesting endpoint device to establish a connection with the network. Moreover, the SE agent may also automatically enforce one or more compliance actions on the requesting endpoint device to force the endpoint device to a complaint status or return to compliant status in the event the endpoint device becomes non-compliant after initially establishing a compliant status. For example, the SE agent may be able to track location and/or geolocation information of the endpoint device. Compliant actions may include one or more of report, repair and/or reinstall actions.

According to exemplary aspects, the C2C framework may provide continuous updates on compliance status of the connected endpoint devices. Moreover, the C2C framework may provide an ability to automatically repair and reinstall one or more applications on the endpoint devices, upon which compliance may rely. In an example, the C2C framework may provide the ability to automatically repair and reinstall one or more applications when the required application is integrated to the C2C framework. The C2C framework may additionally provide an ability to freeze devices when a previously compliant endpoint device becomes non-compliant and appropriate to risk. The C2C framework may cause no user experience (UX) impact to an endpoint device while compliance status of the endpoint device is being assessed or non-compliance issues are being remediated.

In operation 101, the SA server receives a request from an endpoint device to connect to a corresponding network. According to exemplary aspects, the endpoint device may initially ping the SA server to request access or to establish a connection to the corresponding network. In an example, the requesting endpoint device may be a computer, a portable computing device, a smart phone, a smart watch, a virtual reality device, a wearable computing device or the like.

In operation 102, the SE agent continuously collects data from the requesting endpoint device. Data collected from the requesting endpoint device may include, without limitation, timestamp of the request, geolocation, device type, operating system (OS) type and version, encryption status, antivirus protection status, app resilience, and the like. According to exemplary aspects, the continually collected information may be stored and updated in real-time, and made available in one or more reports indicating various device details along with corresponding compliance statuses. For example, compliance statuses may include, without limitation, compliant, non-compliant, in remediation, unknown, not applicable (NA) or the like. In addition to the compliance statuses, corresponding reasons for non-compliance may be indicated, as well as details of any remediation actions performed or set for performance. According to aspects, "real-time" referenced herein and elsewhere in the present disclosure may refer to near real-time which may account for any network latency that may be present.

In operation 103, the SE server determines compliance requirements of the network for which access is requested. According to aspects of the present disclosure, each network or sub-network may have its own set of compliance requirements or pre-defined compliance requirements, such that access to one network, which may be one of many forming a larger network, may not automatically guarantee access to other networks. Moreover, the compliance requirements may be modified by an administrator according to needs of the respective network. For example, if security risk becomes more of a concern for the respective network, encryption and anti-malware policies may be raised to be more stringent. On the other hand, if no or very little security risk is present for the respective network, minimal requirements may be specified to allow for quicker access by various devices.

In an example, compliance requirements may include, without limitation, anti-malware policy, encryption policy, geolocation policy, OS version requirements, application resilience (or "app resilience"), and the like. According to exemplary aspects, one or more of the compliance policies or requirements may be set by an administrator. Moreover, the administrator may also define what status would constitute compliance based on obtained properties or attributes of the requesting endpoint device. For example, for the anti-malware policy, data values indicating a not-protected or unknown status of the endpoint device may result in a non-compliant status. For the encryption status, data values indicating a non-encrypted, drive not encrypted, decrypting and/or unknown status of the endpoint device may result in a non-compliant status. For the geolocation or geozone policy, data value of the endpoint device indicating a location or zone that is not included in a list of permissible locations or zone may result in a non-compliant status. For the OS version policy, data values indicating an OS type not included in a list of permissible OS types, and/or corresponding OS version not included within a range of permissible OS versions may result in a non-compliant status. For the app resilience, data values indicating that at least one application status is non-compliant may result in a non-compliant status for endpoint device.

According to aspects of the present disclosure, the anti-malware policy may mandate the requesting endpoint device is protected by one or more anti-malware applications. For example, for a given anti-malware policy, presence of at least one active anti-malware application on the requesting endpoint device may indicate a compliant status. However, another anti-malware policy may mandate only specified anti-malware application or applications be active on the requesting endpoint device to be compliant. On the other hand, if all anti-malware applications are inactive or disabled, or none are detected, the requesting endpoint device may be determined to be non-compliant. However, if the secure endpoint agent is unable to determine a status of the requesting endpoint device's anti-malware status, the compliance status for the anti-malware policy may be determined as unknown. In an example, the administrator may determine whether the unknown status may be deemed as compliant or non-compliant in view of the network requirements.

According to further aspects, the SE agent may continually perform an anti-malware scan at a predetermined frequency or in response to one or more events, such as a change to the requesting endpoint device or its environment. If a change in the anti-malware information of the requesting endpoint device is detected, new anti-malware information may be uploaded, and the compliance status of the endpoint device may be correspondingly updated.

According to aspects of the present disclosure, the encryption policy may cause the SE agent to monitor whether or not the requesting endpoint device use encryption to protect data stored on its system drive. In an example, the requesting endpoint device may be determined to be compliant for the encryption policy if the SE agent reports encryption status of the requesting endpoint device as encrypted. Compliance statuses for the encryption policy include, without limitation, compliant, non-compliant, unknown or the like. If the encryption status of the requesting endpoint device is determined to be not encrypted and decryption in progress, then the compliance status for the requesting endpoint device may be determined as non-compliant. However, if the secure endpoint agent is unable to determine a status of the requesting endpoint device's encryption status, the compliance status for the encryption policy may be determined as unknown.

Encryption status indicating compliance may include encryption status of full disk encrypted, suspended, encryption in progress or used space encrypted. Encryption status of full disk encrypted may refer to a situation where an entire disk is encrypted. Encryption status of suspended may refer to a situation where encryption is temporarily disabled on the requesting endpoint device due to authorized events, such as system updates, firmware upgrades or other authorized system changes. Encryption status of encryption in progress may refer to a situation where a system drive of the requesting endpoint device is in the process of being encrypted. Encryption status of used space encrypted may refer to a situation where a disk space that contains data is encrypted, but free space is not encrypted.

According to further aspects, the SE agent may continually perform an encryption scan at a predetermined frequency or in response to one or more events, such as a change to the requesting endpoint device or its environment. If a change in the encryption status of the requesting endpoint device is detected, new encryption status information may be uploaded to the SE server and the compliance status of the requesting endpoint device for the encryption policy may be correspondingly updated.

According to further aspects, the geolocation policy mandates that the requesting endpoint device adhere to location-based rules. Location-based rules may mandate that the endpoint device to be located within one of the specified locations, or not be included in a list of specified locations, such as enemy states. More specifically, the SE agent may check to determine whether the requesting endpoint device (or later permitted device) is located in one of the permitted cities, states, provinces and/or countries to connect to the respective network. Alternatively, the SE agent may check to determine whether the requesting endpoint device (or later permitted device) is not located in one of the blocked cities, states, provinces and/or countries.

In an example, if the endpoint device is determined to be compliant and allowed access to a network, and later determines that the respective endpoint device is located in an unauthorized location based on a continued monitoring, the respective endpoint device's compliant status may be changed to a non-compliant status based on its geolocation. Based on the updated non-compliant status, the respective endpoint device's connection to the network may be temporarily frozen until the geolocation of the endpoint device indicates that it is in an authorized location or zone based on the continued monitoring.

According to further aspects, the SE agent may continually perform a geolocation check at a predetermined frequency or in response to one or more events, such as starting a new session. If a change in the location of the requesting endpoint device is detected, new geolocation information may be uploaded to the SE server and the geolocation compliance status may be correspondingly updated.

According to further aspects, the OS version policy mandates that the requesting endpoint device is using one of the permitted OS types and that its version is within a version range of the respective OS type. For example, SE agent may identify the OS installed on the requesting endpoint device and determine whether the version of the OS installed is within the minimum OS version and the maximum OS version permitted by the OS policy. In an example, the latest version of the OS version may or may not be the same as the maximum OS version permitted by the OS policy.

According to further aspects, the access point (AP) policy mandates that the requesting endpoint device is using one of application and that application status is compliant or healthy.

According to further aspects, the SE agent may continually perform the AP policy check at a predetermined frequency or in response to one or more events. If a change in the AP status is detected, new AP information may be uploaded and the AP compliance status may be correspondingly updated.

According to exemplary aspects, the compliance status of "unknown" for the above noted policies may be determined to be compliant, temporarily compliant or not compliant depending on policy requirements of the respective network. For example, for a network including non-sensitive general information, an unknown compliance status may be permitted a temporary compliant or compliant status. Alternatively, for a network including more sensitive information, an unknown compliance status may be equal to a not compliant status and treated accordingly. In an example, compliance status of "unknown" may result when the SE agent is unable to collect or update the required data points (e.g., geographical location or state of encryption) on a device.

In operation 104, the SE server calculates compliance status of the endpoint device requesting access in view of the determined compliance requirements of the network. For example, the SE server may calculate whether or not the OS version of the requesting endpoint device is equal to or higher than the minimum OS version compliance requirement for the network.

In operation 105, the SE server exposes, to the SA, a limited extensible RESTful device compliance API (compliance API), and securely shares the calculated compliance status of the endpoint devices for SA server queries. By providing a limited compliance API, a limited secure communication may be performed between the SE server and the SA server for performing persistent compliance checks while preventing sharing of more sensitive information of the endpoint device. Moreover, by using the compliance API, one or more compliance actions may be automatically enforced, such as automated device level remediation actions, for ensuring automated and continued compliance to ensure a secure access to the requested network. According to exemplary aspects, compliance API may be a vendor neural, and support comply-to-connect functionality across a heterogeneous security ecosystem.

In operation 106, the SA performs agent integration for processing query from one or more agents (e.g., SA agent) via the compliance API of the SE agent to provide real-time compliance data of the requesting endpoint device. In an example, the compliance data include, without limitation, status, non-compliance reasons and the like. According to exemplary aspects, the compliance API returns a list of device compliance data including device user identification (UID), compliant flag to indicate whether the endpoint device is compliant or non-compliant, and if non-compliant, non-compliant reasons. In an example, the compliance API may return compliance information for active devices. Further, the compliance API may be able to call from public API.

In operation 107, the SA enforces, via one or more agents, one or more policy actions based on the real-time compliance data of the requesting endpoint device. According to exemplary aspects, the one or more policy actions may be defined or specified by an administrator. In an example, if the requesting endpoint device is determined to be compliant based on its compliant flag value, the one or more policy actions may include authorizing access to or communication with the requested network. Alternatively, if the requesting endpoint device is determined to be non-compliant based on its compliant flag value, the one or more policy actions may include, without limitation, blocking network access, reporting, repairing and/or reinstalling.

If the endpoint device has already been allowed access to the network based on its previous compliant status, a change to a non-compliant status may invoke additional policy actions, such as block/isolate and/or freeze, along with notification and automated remediation actions. In an example, the reporting action may include a reporting of identification of compliance policy, the non-compliant status of the endpoint device, and one or more reasons for the non-compliant status. The repair action may include one or more actions for addressing the reasons for the non-compliant status of the endpoint device, such as a configuration fix or the like or instructing the endpoint device to relocate to one of the permitted locations or zones (or to locate away from one of the non-permitted locations or zones). Lastly, the reinstalling action may include reinstalling an application to address the non-compliant status of the endpoint device, such as installing one of the permissible OS versions.

In operation 108, the SA determines whether the requesting endpoint device is compliant after one or more policy actions are performed on the requesting endpoint device. In addition to the execution of the one or more policy actions for automated forced compliance when the endpoint device is deemed non-compliant, an application resilience status may be provided to indicate a status of the one or more policy actions performed as well as corresponding compliance status. In an example, if the one or more policy actions include installation of an OS version within a range of permissible OS versions, a resilience status indicating that (i) the application or the OS version is not installed, and/or (ii) the OS version installed is not within the range of permissible OS versions. On the other hand, a resilience status indicating that (a) the application or the OS version is installed, (b) the OS version installed is included within the range of permissible OS versions, and (c) the OS version is running on the endpoint device may result in a compliant status.

If the SA determines that the requesting endpoint device is compliant after performance of the one or more policy actions in operation 108, the method proceeds to operation 109. Alternatively, if the SA determines that the requesting endpoint device is still not compliant, the method proceeds back to operation 110.

In operation 110, the SA indicates a detection of one or more change to the compliance status of the endpoint device in view of the continuous monitoring, and directs the method back to operation 106.

In operation 109, the SA allows access to the requested network and performs continuous or persistent monitoring and enforcement. According to exemplary aspects, the continuous or persistent monitoring may be performed on the endpoint device to check for any relevant changes. The continuous or persistent monitoring may be performed based on a secure and always-on connection between the endpoint device and the SA. For example, relevant changes may include, without limitation, a change to OS version, encryption status, status of anti-malware application, and geolocation. If a relevant change is detected on the endpoint device, a compliant status may be updated to non-compliant for the respective endpoint device and corresponding enforcement action(s) may be performed on the respective endpoint device. Corresponding enforcement action(s) may include, without limitation, freezing access to the network until the endpoint device becomes compliant (e.g., geolocation of the endpoint device is located back in one of the authorized areas), automated updating the endpoint device to force the endpoint back into compliance, or the like. Upon return to compliant status, the SE server may unfreeze the respective endpoint device to reestablish connection to the network.

FIG. 2 illustrates an exemplary structure of a client device according to embodiments. According to exemplary aspects, the client device may be an endpoint device. An SE agent described herein can be initially downloaded onto a memory storage device of a client device, such as a solid state drive or a hard disk drive of the device, from a deterministic network endpoint, e.g., one or more servers or one or more cloud servers (collectively referred to herein as "server"), or from a disk or flash drive or other portable storage device. In some scenarios, the SE agent, can be stored in a memory storage device of the client device at the factory. To ensure that the client device is in a state where the SE agent can be installed, the client device is checked for sufficient storage space on the storage device, as well as for the presence of a security chip, e.g., a trusted platform module (TPM), with a certain set of commands enabled and for the presence of certain other bits of code on the client device that will allow efficient installation and enablement of the capability. If sufficient space is not available, the extensible firmware interface (EFI) partition on the storage device can be resized in a known manner to accommodate the SE agent.

In embodiments, the SE agent collects device information, and securely share relevant device information including those related to compliance with respect to various policies with SE server via a limited extensible RESTful API. In this way, SE securely share limited device related information with an SA for determining compliance and to provide any necessary remediation actions on the client device to place the client device in compliance for connecting to a target network.

Once installed, the SE agent may continuously collect relevant data of the client device from its memory for determining its compliance status. Data collected may include, without limitation, timestamp of the request, geolocation, device type, OS type and version, encryption status, antivirus protection status, app resilience, and the like. According to exemplary aspects, the continually collected information may be stored and updated in real-time, and made available in one or more reports indicating various device details along with corresponding compliance statuses.

Moreover, the SE server may determine compliance requirements of the network for which access is requested by the client device. According to aspects of the present disclosure, each network or sub-network may have its own set of compliance requirements or pre-defined compliance requirements, such that access to one network, which may be one of many forming a larger network, may not automatically guarantee access to other networks. Moreover, the compliance requirements may be modified by an administrator according to needs of the respective network. In an example, compliance requirements may include, without limitation, anti-malware policy, encryption policy, geolocation policy, OS version requirements, app resilience, and the like.

In consideration of the determined compliance requirements of the network and the continually collected client device information, compliance status of the endpoint device may be calculated. For example, the SE server may calculate whether or not the OS version of the requesting endpoint device is equal to or higher than the minimum OS version compliance requirement for the network.

The system 200 is generally shown and may include a computer system 202, which may be a client device. However, aspects of the present disclosure are not limited thereto, such that the client device may include other types of computing devices, such as smart phones, smart watch, other wearable computing devices, other communication devices and the like.

The computer system 202 may include a set of instructions that can be executed to cause the computer system 202 to perform any one or more of the methods or computer-based functions disclosed herein, either alone or in combination with the other described devices. The computer system 202 may operate as a standalone device or may be connected to other systems or peripheral devices. For example, the computer system 202 may include, or be included within, any one or more computers, servers, systems, communication networks or cloud environment. Even further, the instructions may be operative in such cloud-based computing environment.

In a networked deployment, the computer system 202 may operate in the capacity of a server or as a client user computer in a server-client user network environment, a client user computer in a cloud computing environment, or as a peer computer system in a peer-to-peer (or distributed) network environment. The computer system 202, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 202 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 2, the computer system 202 may include at least one processor 204. The processor 204 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 204 is an article of manufacture and/or a machine component. The processor 204 is configured to execute software instructions in order to perform functions as described in the various embodiments herein. The processor 204 may be a general-purpose processor or may be part of an application specific integrated circuit (ASIC). The processor 204 may also be a microprocessor, a microcomputer, a processor chip, a controller, a microcontroller, a digital signal processor (DSP), a state machine, or a programmable logic device. The processor 204 may also be a logical circuit, including a programmable gate array (PGA) such as a field programmable gate array (FPGA), or another type of circuit that includes discrete gate and/or transistor logic. The processor 204 may be a central processing unit (CPU), a graphics processing unit (GPU), or both. The processor 204 may include a quantum processor and/or a photonic processor. Additionally, any processor described herein may include multiple processors, parallel processors, or both. Multiple processors may be included in, or coupled to, a single device or multiple devices.

The computer system 202 may also include a computer memory 206. The computer memory 206 may include a static memory, a dynamic memory, or both in communication. The computer memory 206 may include a quantum memory. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 206 may comprise any combination of memories or a single storage.

The computer system 202 may further include a display 208, such as a liquid crystal display (LCD), an organic light emitting diode (OLED), a flat panel display, a solid state display, a cathode ray tube (CRT), a plasma display, or any other type of display, examples of which are well known to skilled persons.

The computer system 202 may also include at least one input device 210, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 202 may include multiple input devices 210. Moreover, those skilled in the art further appreciate that the above-listed, exemplary input devices 210 are not meant to be exhaustive and that the computer system 202 may include any additional, or alternative, input devices 210.

The computer system 202 may also include a medium reader 212 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 206, the medium reader 212, and/or the processor 210 during execution by the computer system 202.

Furthermore, the computer system 202 may include any additional devices, components, parts, peripherals, hardware, software or any combination thereof which are commonly known and understood as being included with or within a computer system, such as, but not limited to, a network interface 214 and an output device 216. The output device 216 may be, but is not limited to, a speaker, an audio out, a video out, a remote-control output, a printer, or any combination thereof.

Each of the components of the computer system 202 may be interconnected and communicate via a bus 218 or other communication link. As shown in FIG. 2, the components may each be interconnected and communicate via an internal bus. However, those skilled in the art appreciate that any of the components may also be connected via an expansion bus. Moreover, the bus 218 may enable communication via any standard or other specification commonly known and understood such as, but not limited to, peripheral component interconnect, peripheral component interconnect express, parallel advanced technology attachment, serial advanced technology attachment, etc.

The computer system 202 may be in communication with one or more servers, including at least one SE server 220 and at least one SA server 230, via a network 240. The network 240 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 240 which are known and understood may additionally or alternatively be used and that the exemplary networks 240 are not limiting or exhaustive. Also, while the network 240 is shown in FIG. 2 as a wireless network, those skilled in the art appreciate that the network 240 may also be a wired network.

The SE server 220 is shown in FIG. 2. However, those skilled in the art appreciate that, in alternative embodiments of the present application, the SE server 220 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the SE server 220 may be any additional device or apparatus commonly known and understood in the art without departing from the scope of the present application. For example, the SE server 220 may be the same or similar to the computer system 202. Furthermore, those skilled in the art similarly understand that the device may be any combination of devices and apparatuses.

The SE server 220 includes at least a compliance processor 221 and a compliance database (Db) 222. Although the compliance database 222 is illustrated as being included in the SE server 220, aspects of the present disclosure are not limited thereto such that the compliance database 222 may reside outside of the SE server 220 and accessed via the network 240.

The SA server 230 is also shown in FIG. 2. However, those skilled in the art appreciate that, in alternative embodiments of the present application, the SA server 230 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the SA server 230 may be any additional device or apparatus commonly known and understood in the art without departing from the scope of the present application. For example, the SA server 230 may be the same or similar to the computer system 202. Furthermore, those skilled in the art similarly understand that the device may be any combination of devices and apparatuses.

Of course, those skilled in the art appreciate that the above-listed components of the computer system 202 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Figure 3A:
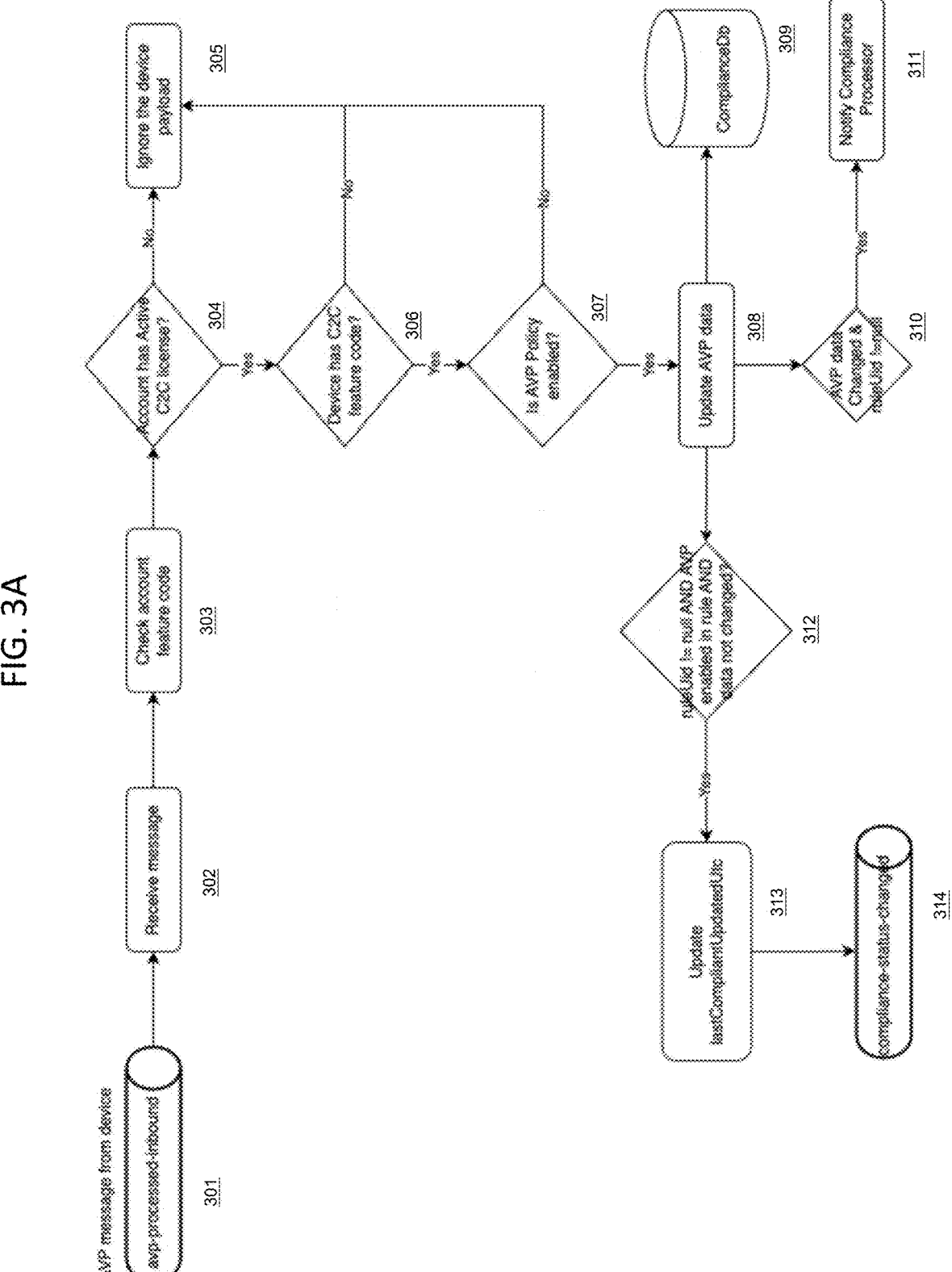
Figure 3C:
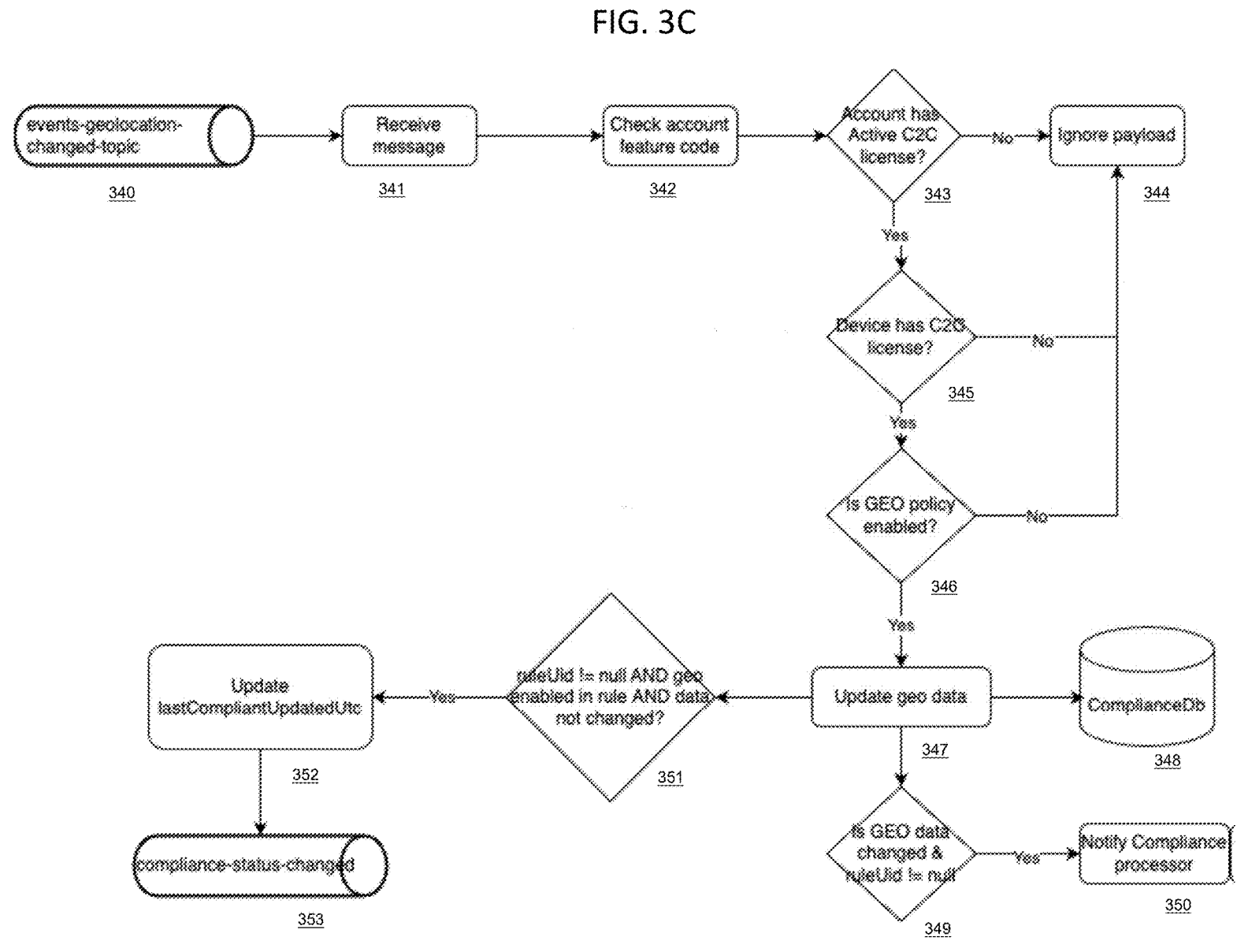

FIGS. 3A-3C illustrate exemplary flowcharts for updating compliance status of an endpoint device in a manner that enables the endpoint to maintain its compliant state prior to any network status interruptions or unstable computing state scenarios involving the endpoint, according to embodiments.

FIG. 3A illustrates a system for updating compliance status in response to a message related to antivirus protection (AVP) status of an endpoint device. As illustrated in FIG. 3A, at step 301, the endpoint device may generate an AVP message as payload. At step 302, the AVP message is received by the SE server 220 via a limited extensible RESTful API. According to aspects, the SE server 220 may store C2C license for various endpoint devices. In an example, the endpoint device may be implemented by the computer system 202. According aspects of the present disclosure, the AVP status message generated by the endpoint device may include data or information regarding a change in status of the antivirus program operating in the endpoint device. In an example, the AVP message may include information related to one or more antivirus or anti-malware applications installed and/or enabled on the endpoint device. Such information may additionally include, but is not limited to, timestamp of its last run, identification of any virus or malware found in the endpoint device and any remediation actions performed for the identified virus or malware.

At step 303, the SE server 220 may request for data related to an account or AVP feature code of the endpoint device, and the requested data may be returned or not returned based on whether the endpoint device has a C2C license stored at the SE server 220. At step 304, the SE server 220 may check whether an account associated with the endpoint device has an active C2C license or not. Also, at step 306, the SE server 220 may check whether the endpoint device has a C2C feature code. At step 307, the SE server 220 may additionally check to determine whether the AVP compliance or anti-malware policy is enabled for the respective network. If the endpoint device, implemented by, for example, the computer system 202, does not have an active C2C license or a C2C feature code, then the payload from the endpoint device is ignored by the SE server 220 at step 305. Similarly, if the respective network did not enable the AVP policy as a requirement for compliance to allow access, the payload from the endpoint device is also ignored by the SE server 220 at step 305. In an example, the C2C license may refer to a license for utilizing the C2C framework and its features. The AVP feature code may refer to a predefined sequence or characters corresponding to specific features of the AVP that is recognized by the C2C framework.

However, if the endpoint device has the active C2C license and AVP feature code, and the network has enabled an AVP policy, the SE server 220 will update AVP data associated with the AVP message generated by the endpoint device at step 308. In an example, the at least one feature code may include, for example, one or more of AVP, encryption, geolocation, application resilience reporting, and OS version. The updating of the AVP data may be performed using the compliance database 222 at step 309. After the updating of the AVP data, if the AVP data of the endpoint device is determined to have changed in step 310, the compliance processor 221 of the SE server 220 may be notified at step 311. However, after updating of the AVP data, if the AVP of the endpoint device is determined to be enabled and the AVP data is determined to have not changed during step 312, the last compliance update coordinated universal time (UTC) is updated at step 313, along with an indication of a change of the AVP compliance status at step 314.

FIG. 3B illustrates a system for updating compliance status in response to a message related to encryption protection (ESP) status of an endpoint device. In an example, the endpoint device may be implemented by the computer system 202. As illustrated in FIG. 3B, the endpoint device may generate an ESP message as payload at step 321, which may be received by the SE agent via a limited extensible RESTful API at step 322. In an example, the ESP message may include information related to active engagement of encryption, related events (e.g., system updates, firmware upgrades and etc.), status of encryption or decryption, enabled on the endpoint device, whether or not disk space includes encrypted data, a portion of the disk space that is encrypted, whether or not free disk space is encrypted and the like. Such information may additionally include timestamp of its last encryption policy compliance run and its results.

At step 323, the SE server 220 may request for data related to an account or ESP feature code of the endpoint device. At step 324, the SE server 220 may initially check an account related to the endpoint device to check for an active C2C license. Further, in step 326, the SE server 220 may additionally check whether the endpoint device has an active C2C license. At step 327, the SE server may check to determine whether the ESP policy is enabled for the respective network. If the account associated with the endpoint device or the endpoint device itself does not have an active C2C license or a ESP feature code, then the payload from the endpoint device is ignored by the SE server 220, at step 325. Similarly, if the respective network did not enable the ESP policy as a requirement for compliance to allow access, the payload from the endpoint device is also ignored by the SE server 220 at step 325. In an example, the C2C license may refer to a license for utilizing the C2C framework and its features. The ESP feature code may refer to a predefined sequence or characters corresponding to specific features of the ESP that is recognized by the C2C framework.

However, if the endpoint device has the active C2C license and ESP feature code, and the network has enabled an ESP policy, the SE server 220 will update ESP data associated with the ESP message generated by the endpoint device at step 328. The updating of the ESP data may be performed in the compliance database 222 at step 329. After the updating of the ESP data, if the ESP data of the endpoint device is determined to have changed at step 330, the compliance processor 221 of the SE server 220 may be notified at step 331. However, after updating of the ESP data, if the ESP of the endpoint device is determined to be enabled and the ESP data is determined to have not changed at step 332, last compliance update UTC is updated at step 333, along with an indication of a change of the ESP compliance status in step 324.

FIG. 3C illustrates a system for updating compliance status in response to a message related to geolocation protection (GEO) status of an endpoint device. In an example, the endpoint device may be implemented by the computer system 202. As illustrated in FIG. 3C, the endpoint device may generate a GEO message as payload at step 340, which may be received by the SE server 220 via a limited extensible RESTful API at step 341. In an example, the GEO message may include information related to a location of the endpoint device, a timestamp of the location detected, duration at the location detected, a movement information with respect to previous location detected and the like. Such information may additionally include timestamp of its geolocation compliance run and its results.

At step 342, the SE server 220 may request for data related to an account or GEO feature code of the endpoint device. At step 343, the SE server 220 may initially check an account related to the endpoint device to check for an active C2C license. Further, at step 345, the SE server 220 may additionally check whether the endpoint device has an active C2C license. At step 346, the SE server may check to determine whether the GEO policy is enabled for the respective network. If the account associated with the endpoint device or the endpoint device itself does not have an active C2C license or a GEO feature code, then the payload from the endpoint device is ignored by the SE server 220 at step 344. Similarly, if the respective network did not enable the GEO policy as a requirement for compliance to allow access, the payload from the endpoint device is also ignored by the SE server 220 at step 344. In an example, the C2C license may refer to a license for utilizing the C2C framework and its features. The GEO feature code may refer to a predefined sequence or characters corresponding to specific features of the GEO that is recognized by the C2C framework.

However, if the endpoint device has the active C2C license and GEO feature code, and the network has enabled a GEO policy, the SE server 220 will update GEO data associated with the GEO message generated by the endpoint device at step 347. The updating of the GEO data may be performed in the compliance database 222 at step 348. After the updating of the GEO data, if the GEO data of the endpoint device is determined to have changed at step 349, the compliance processor 221 of the SE server 220 may be notified at step 350. However, after updating of the GEO data, if the GEO data of the endpoint device is determined to be enabled and the GEO data is determined to have not changed at step 351, last compliance update UTC is updated at step 352, along with an indication of a change of the GEO compliance status at step 353.

Using the techniques described in FIGS. 3A-3C above, embodiments of the present invention can ensure that all endpoint devices associated with a particular computer network can maintain real-time compliance with any security policy enacted irrespective of the endpoints particular hardware and/or software profile.

FIGS. 4A-4D illustrate exemplary flowcharts for application resilience in a manner that demonstrates how an endpoint can maintain its compliant state prior to any network status interruptions or unstable computing state scenarios involving the endpoint, according to embodiments.

Figure 4A:
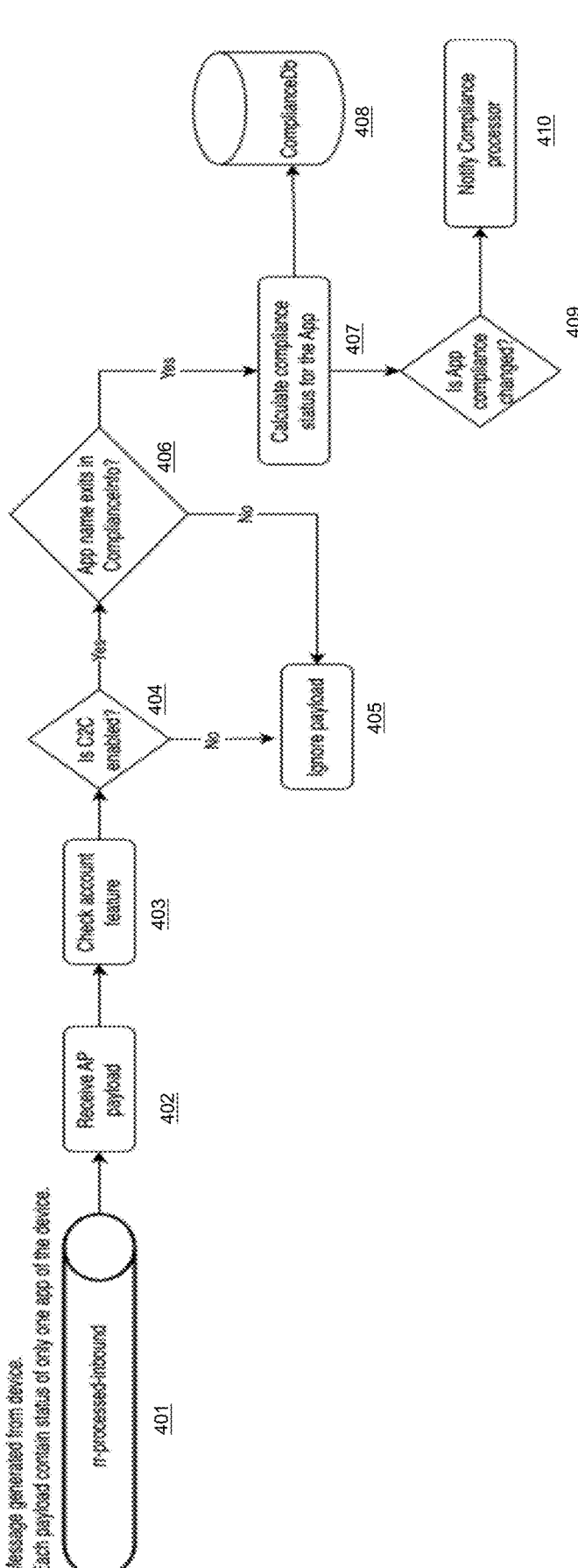

FIG. 4A illustrates a flowchart for handing an application status information. As illustrated in FIG. 4A, the endpoint device may generate an application resilience (AR) or application persistence (AP) status message as payload at step 401, which may be received by the SE server 220 via a limited extensible RESTful API at step 402. In an example, the endpoint device may be implemented by the computer system 202. According to exemplary aspects, the AP status message may be generated by an SE agent. Each payload may contain compliance status of only one application of the device. The SE server 220 may then check the account feature indicated in the payload at step 403, and check for whether C2C license is enabled for the respective network at step 404. If the C2C license is not enabled for the network, the payload from the endpoint device may be ignored by the SE server 220 at step 405. On the other hand, if the C2C license is enabled for the network, a check is performed by the SE server 220 to check whether the application name exists in the compliance information at step 406.

When it is determined that the application name indicated in the payload exists in the compliance information stored in the SE server 220, compliance status may be calculated for the respective application indicated in the payload at step 407. Once calculated, the compliance status may be stored in the compliance database 222 along with its timestamp at step 408. Moreover, a determination of whether the calculated compliance status indicates a change in previous compliance status of the respective application at step 409. If the change in compliance status is determined, a corresponding compliance processor 221 may be notified at step 410.

Figure 4B:
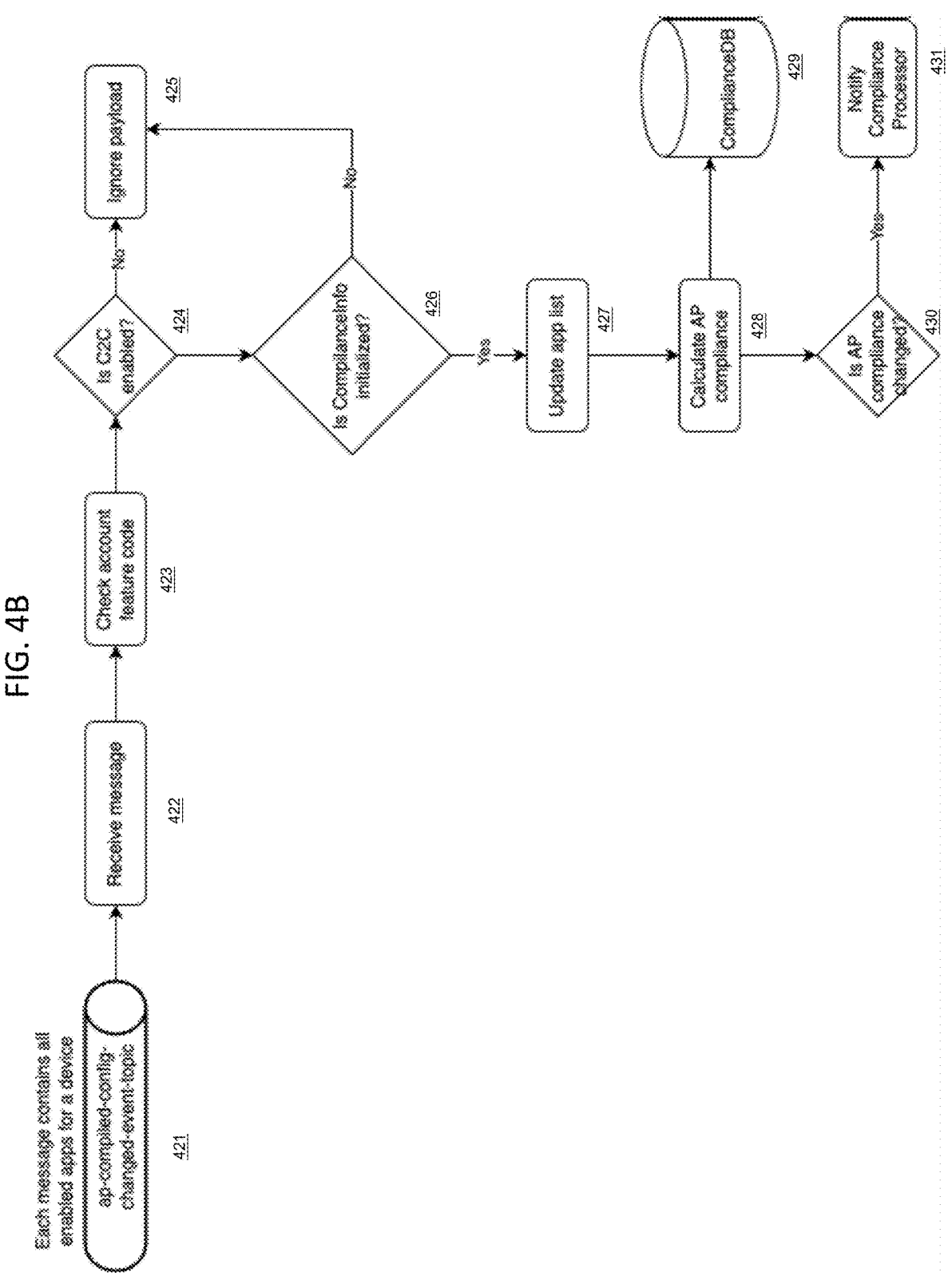

FIG. 4B illustrates a flowchart for handing an AP configuration changes. As illustrated in FIG. 4B, the endpoint device may generate an event message indicating AP configuration changes as payload at step 421, which may be received by the SE server 220 via a limited extensible RESTful API at step 422. In an example, the endpoint device may be implemented by the computer system 202. In an example, each event message may contain all enabled applications for the endpoint device. The SE server 220 may then check the account feature code indicated in the payload at step 423, and check for whether C2C license is enabled for the respective network at step 424.

If the C2C license is not enabled for the network, the payload from the endpoint device may be ignored by the SE server 220 at step 425. On the other hand, if the C2C license is enabled for the network, a check is performed by the SE server 220 to check whether compliance information is initialized for the endpoint device at step 426 If the compliance information is determined not to be initialized for the endpoint device, the payload from the endpoint device may be ignored by the SE server 220 at step 425.

When the SE server 220 determines that the compliance information has been initialized for the endpoint device, one or more updates may be performed on the list of applications stored or active on the endpoint device at step 427. For example, if a new application has been activated, the initialized compliance information may be updated to include the newly activated application. Once an updated listing of applications is generated, the AP or the endpoint device compliance may be calculated with respect to the updated listing of the applications at step 428. Once calculated, the compliance status with respect to each of the applications may be stored in the compliance database 222 along with its timestamp at step 429. Moreover, a determination of whether the calculated compliance status indicates a change in previous compliance status of the respective applications at step 430. If the change in compliance status is determined, a corresponding compliance processor 221 may be notified at step 431.

FIG. 4C illustrates a flowchart for handing a scaling application resilience (SAR) status change. According to exemplary aspects, SAR may refer to an application's ability to maintain functionality and deliver a seamless user experience despite encountering failures in its components or infrastructure. For example, SAR's failure may include one or more failures to meet compliance requirements for accessing a network. When a failure is detected, the failure status of the SAR application may be indicated and a reason or reasons for the failure may be identified for automated correction by the SE server 220, thereby delivering a seamless user experience despite the initially encountered failure. According to exemplary aspects, the failure may be a failure with respect to any user defined applications.

As illustrated in FIG. 4C, an event message indicating SAR application health update may be generated as payload at step 441, which may be received by the SE agent via a limited extensible RESTful API at step 442. The SE server 220 may check whether an account associated with the SAR application health update and corresponding endpoint device have an active C2C license at steps 443 and 444. In an example, the endpoint device may be implemented by the computer system 202. If the account associated with the SAR application health update or the corresponding endpoint device does not have an active C2C license, then the payload is ignored by the SE server 220 at step 445. Also, if the payload is determined to be not SAR related at step 446, then the payload is ignored by the SE server 220 at step 445. In addition, if the endpoint device is determined to lack an active C2C license, then the payload is ignored by the SE server 220 at step 445. In an example, the C2C license may refer to a license for utilizing the C2C framework and its features.

On the other hand, if the account associated with the SAR application health update and the corresponding endpoint device have active C2C licenses in step 444, SAR is determined to be included in the payload at step 446, and the endpoint device is determined to have an active C2C license at step 447, then the SAR application status may be updated at step 448 and stored in the compliance database 222 at step 449. According to exemplary aspects, the SAR application status may indicate one or more failures for the various compliance checks performed and one or more reasons for such failures. In an example, the failure may be related to the antivirus protection compliance policy, and the reason for such failure may be due to lack of an active antivirus program running on the endpoint device.

Moreover, if the SAR application status update is a change from its previous status at step 450, then the compliance processor 221 is notified at step 451. For example, if the previous status indicated a satisfactory compliance for the antivirus protection compliance policy, and the SAR application status update indicates a compliance failure for the antivirus protection compliance policy, perhaps due to deactivating or removing the antivirus program, then the compliance processor 221 is notified of the change.

Once the compliance processor 221 is notified of the change, it may perform one or more actions based on the change indicated in the notification. For example, if the change is from a previously failed state to a successful compliance state, then the compliance processor 221 may authorize the endpoint device to establish connection to the network for access. On the other hand, if the change is from a null state or from a compliant state to a failed state, then the compliance processor 221 may automatically initiate one or more remediation actions to force the endpoint device into a compliant state.

For example, if the failure is with respect to the antivirus protection compliance policy, one or more remediation actions may include identification of an authorized antivirus program, installation of the identified antivirus program and activation of the installed antivirus program. However, aspects of the present disclosure are not limited thereto, such that the remediation actions may take account of the status of the endpoint device before performing the actions. For example, if the endpoint device has an authorized antivirus program already installed but is deactivated, the remediation action may be to reactivate the antivirus program without necessarily reinstalling the respective antivirus program. Upon successful remediation, the endpoint device may generate another event message indicating an SAR application health update for processing.

Figure 4D:
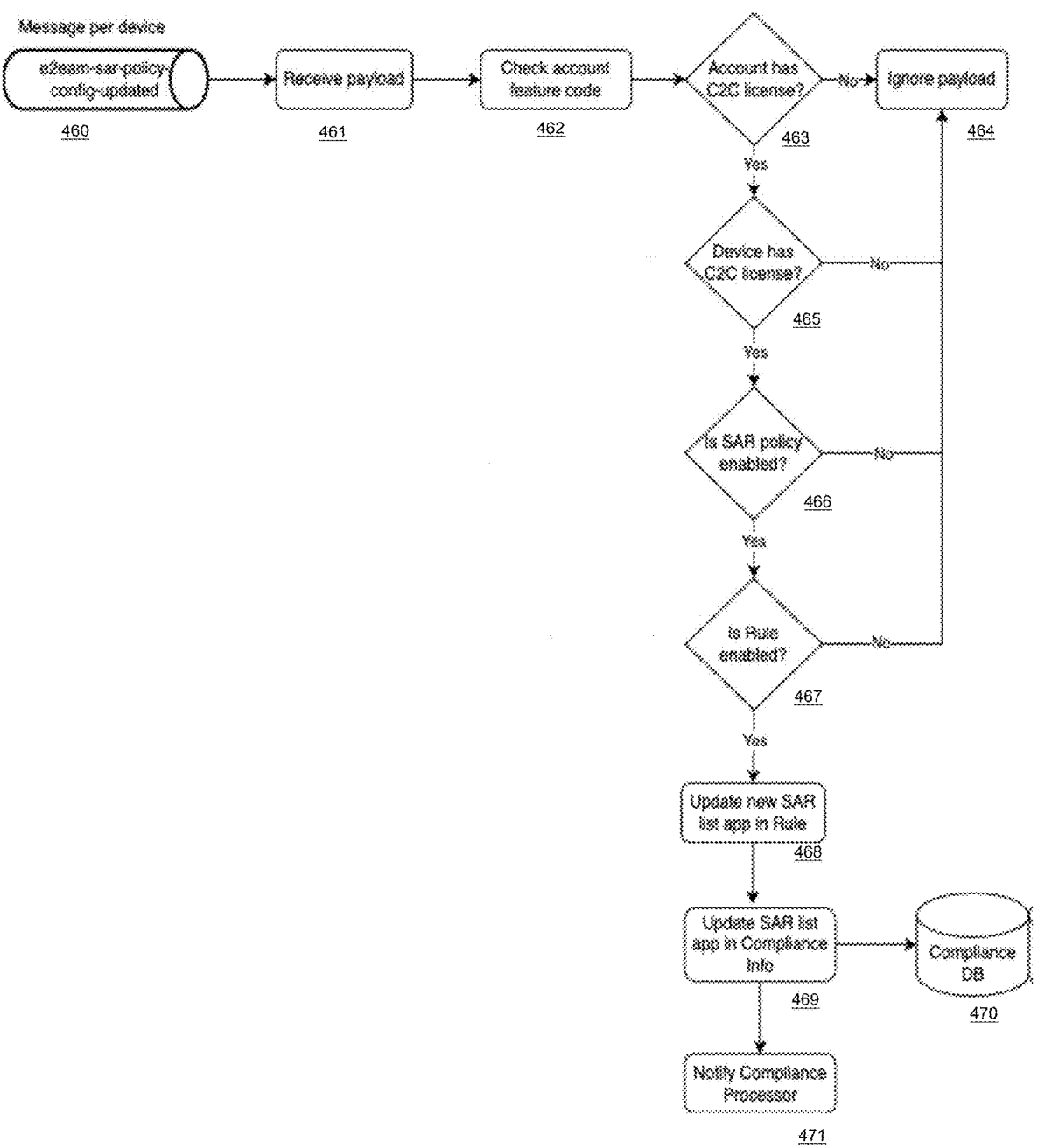

FIG. 4D illustrates a flowchart for handing an SAR configuration change. As illustrated in FIG. 4D, an event message indicating an SAR policy configuration update may be generated as payload by an endpoint device at step 460 and received by the SE server 220 via a limited extensible RESTful API at step 461. According to exemplary aspects, an endpoint device may be associated with a plurality of SAR applications. In an example, the endpoint device may be implemented by the computer system 202. According to further aspects, each SAR application may correspond to one or more compliance policies, which may specify a set of remediation actions for addressing a set of corresponding reasons for non-compliance. In an example, an SAR configuration change may include, without limitation, a change to a listing of SAR applications, a listing of remediation actions performed for the respective SAR applications, enabling/disabling of one or more SAR applications, and the like.

Upon receipt of the payload, the SE server 220 may check an account feature code for the endpoint device, whether an account associated with the SAR application and corresponding endpoint device have an active C2C license at steps 462, 463 and 465. Moreover, the SE server 220 may additionally check whether or not SAR policy is enabled at step 466 and whether or not compliance rules are enabled for the respective network at step 467. If the account associated with the SAR application or the corresponding endpoint device does not have an active C2C license, then the payload is ignored by the SE server 220 at step 464. Also, if the SAR policy or compliance rules are not enabled for the respective network, then the payload is ignored by the SE server 220 at step 464. In an example, the C2C license may refer to a license for utilizing the C2C framework and its features.

On the other hand, if the account associated with the SAR application and the corresponding endpoint device have active C2C licenses, and the network has its compliance rules enabled, then a new SAR list of applications reflecting the SAR configuration change is updated in the compliance rules of the respective network at step 468. Subsequent to updating the new SAR list of applications in the compliance rules, the new SAR list of applications is also updated in the compliance information at step 469 and stored in the compliance database 222 at step 470. Also, the compliance processor 221 may be notified of the updated SAR list of applications at step 471.

Using the techniques described in FIGS. 4A-4D above, embodiments of the present invention can ensure that all endpoint devices associated with a particular computer network can maintain real-time compliance with any security policy enacted irrespective of the endpoints particular hardware and/or software profile.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing persistent comply to connect (C2C) for establishing a connection to a network, the method comprising:

receiving, at a secure access (SA) server from an endpoint device, a request to access a first network;

continuously collecting, by a secure endpoint (SE) agent, data from the endpoint device requesting to access the first network;

determining, by an SE server, compliance requirements of the first network;

calculating, by the SE server, compliance status of the endpoint device in view of the determined compliance requirements of the first network;

exposing, by the SE server, a limited device compliance application programming interface (API) for securely sharing the calculated compliance status of the endpoint device with an SA server;

performing, by the SA server, integration with the SE agent via the limited device compliance API for processing query from the SA server, and receiving real-time compliance data of the endpoint device;

automatically enforcing, by the SA server, one or more policy actions based on the real-time compliance data of the endpoint device to force the endpoint device into compliance when the real-time compliance data of the endpoint device indicates non-compliance with at least one of the compliance requirements of the first network; and continuously monitoring, after the endpoint device has been forced into compliance and granted access to the first network, the compliance status of the endpoint device for a change in the compliance status, and automatically enforcing, by the SA server, the one or more policy actions to resolve the change in the compliance status of the endpoint device.

2. The method of claim 1, wherein the data from the endpoint device includes data related to geolocation, operating system (OS) type and version, encryption status, application resilience, and antivirus protection status of the endpoint device.

3. The method of claim 1, wherein the compliance requirements include one or more of operating system requirement, encryption protection, antivirus protection, application resilience, and geolocation.

4. The method of claim 3, wherein the geolocation requires the endpoint device to be located in a location among a plurality of authorized location.

5. The method of claim 3, wherein the geolocation requires the endpoint device not to be located in a location among a plurality of unauthorized locations.

6. The method of claim 3, wherein the operating system requirement includes a type of operating system active on the endpoint device corresponding to an authorized operating system among a plurality of authorized operating systems.

7. The method of claim 6, wherein the operating system requirements further includes a version of the authorized operating system to be included within a range of authorized versions.

8. The method of claim 3, wherein the encryption protection requires that encryption is fully encrypted at the endpoint device, in progress at the endpoint device or a disk space of the end device storing data is encrypted.

9. The method of claim 3, wherein the antivirus protection requires that an antivirus program active on the endpoint device corresponds to an authorized antivirus program among a plurality of authorized antivirus programs.

10. The method of claim 1, wherein the compliance requirements of the first network is configurable by an administrator of the first network.

11. The method of claim 1, wherein the compliance requirements of the first network are different from compliance requirements of a second network different from the first network.

12. The method of claim 11, wherein the first network and the second network are included in Department of Defense Information Network.

13. The method of claim 1, wherein the real-time compliance data includes a compliance status with respect to a compliance requirement among the compliance requirements of the first network.

14. The method of claim 13, wherein the real-time compliance data further includes a corresponding non-compliance reason when the compliance status indicates a non-compliance.

15. The method of claim 1, wherein the one or more policy actions include an automated action on the endpoint device to resolve or mitigate the non-compliance of the endpoint device.

16. The method of claim 15, wherein the automated action includes automatically installing an authorized antivirus program or an authorized operating system version on the endpoint device, or updating or patching an already installed authorized antivirus program or operating system.

17. The method of claim 15, wherein the automated action includes automatically activating encryption on the endpoint device.

18. The method of claim 15, wherein the automated action includes temporarily freezing access to the first network and performing continuous monitoring until the endpoint device becomes compliant with respect to the compliance requirements of the first network.

19. A system for performing persistent comply to connect (C2C) for establishing a connection to a network, the system comprising:

an endpoint device including a hardware processor and a memory storing a secure endpoint (SE) agent;

an SE server; and a secure access (SA) server; and wherein the system is configured to:

receiving, at the SA server from an endpoint device, a request to access a first network;

continuously collecting, via the SE agent, data from the endpoint device requesting to access the first network;

determining, via the SE server, compliance requirements of the first network;

calculating, via the SE server, compliance status of the endpoint device in view of the determined compliance requirements of the first network;

exposing, via the SE server, a limited device compliance application programming interface (API) for securely sharing the calculated compliance status of the endpoint device with an SA server;

performing, via the SA server, integration with the SE agent via the limited device compliance API for processing query from the SA server, and receiving real-time compliance data of the endpoint device;

automatically enforcing, via the SA server, one or more policy actions based on the real-time compliance data of the endpoint device to force the endpoint device into compliance when the real-time compliance data of the endpoint device indicates non-compliance with at least one of the compliance requirements of the first network; and continuously monitoring, after the endpoint device has been forced into compliance and granted access to the first network, the compliance status of the endpoint device for a change in the compliance status, and automatically enforcing, by the SA server, the one or more policy actions to resolve the change in the compliance status of the endpoint device.

20. A non-transitory computer readable storage medium that stores a computer program for performing persistent comply to connect (C2C) for establishing a connection to a network, when executed by a processor, causing a system to perform a process comprising:

receiving, at a secure access (SA) server from an endpoint device, a request to access a first network;

continuously collecting, by a secure endpoint (SE) agent, data from the endpoint device requesting to access the first network;

determining, by an SE server, compliance requirements of the first network;

calculating, by the SE server, compliance status of the endpoint device in view of the determined compliance requirements of the first network;

exposing, by the SE server, a limited device compliance application programming interface (API) for securely sharing the calculated compliance status of the endpoint device with an SA server;

performing, by the SA server, integration with the SE agent via the limited device compliance API for processing query from the SA server, and receiving real-time compliance data of the endpoint device;

automatically enforcing, by the SA server, one or more policy actions based on the real-time compliance data of the endpoint device to force the endpoint device into compliance when the real-time compliance data of the endpoint device indicates non-compliance with at least one of the compliance requirements of the first network; and continuously monitoring, after the endpoint device has been forced into compliance and granted access to the first network, the compliance status of the endpoint device for a change in the compliance status, and automatically enforcing, by the SA server, the one or more policy actions to resolve the change in the compliance status of the endpoint device.

\* \* \* \* \*